Dec. 30, 1969     H. ALBERTS     3,487,145
METHOD FOR MAKING A SLIDE FASTENER ELEMENT
Filed Sept. 12, 1966     2 Sheets-Sheet 1
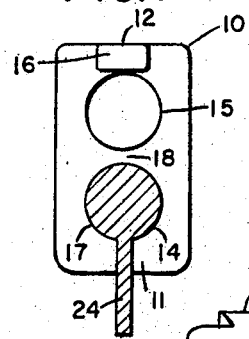
FIG. 1
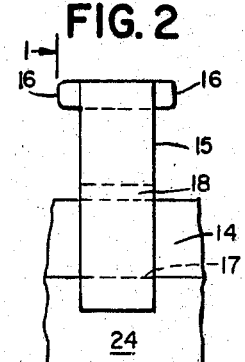
FIG. 2
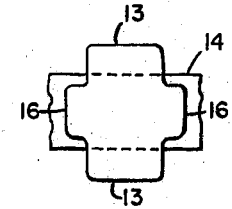
FIG. 3.
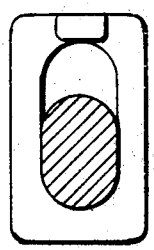
FIG. 4.
FIG. 5
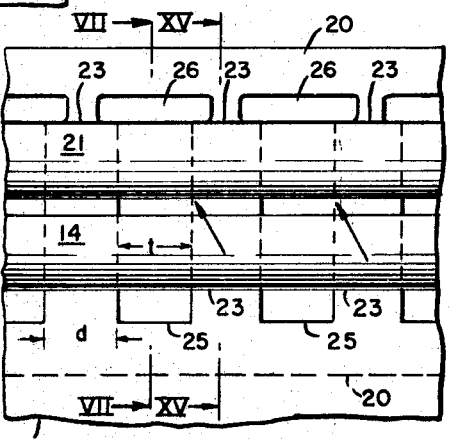
FIG. 6.
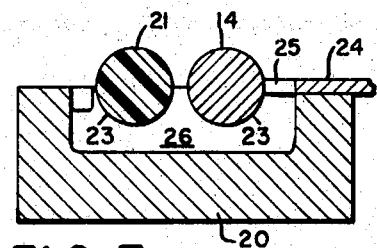
FIG. 7.
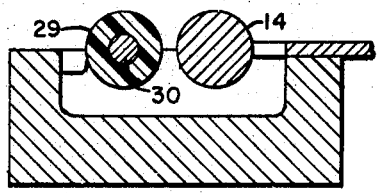
FIG. 8.
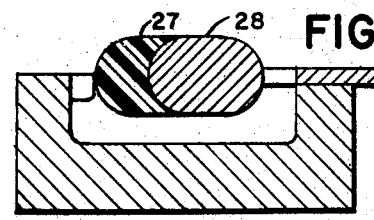
FIG. 9
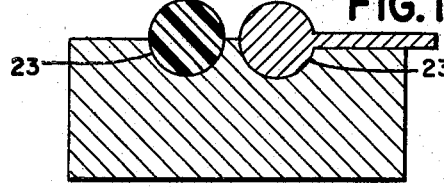
FIG. 15
FIG. 10.
INVENTOR
Herbert Alberts
BY *Otto John [signature]*
ATTORNEY Dec. 30, 1969     H. ALBERTS     3,487,145
METHOD FOR MAKING A SLIDE FASTENER ELEMENT
Filed Sept. 12, 1966     2 Sheets-Sheet 2
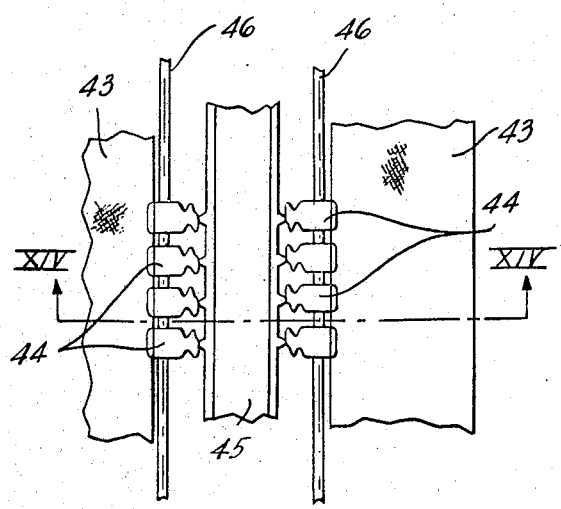
PRIOR ART FIG. 13
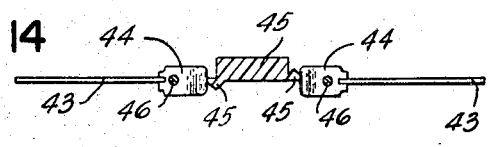
PRIOR ART FIG. 14
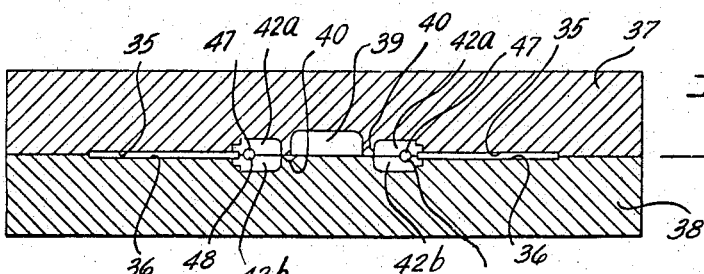
FIG. 11 PRIOR ART
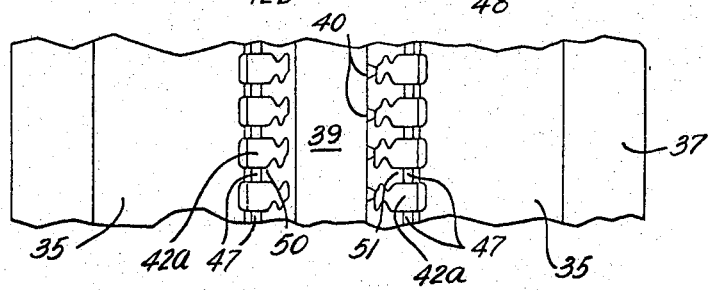
PRIOR ART FIG. 12
INVENTOR:
HERBERT ALBERTS
BY *Otto John Munz*
ATTORNEY United States Patent Office 3,487,145
Patented Dec. 30, 1969

3,487,145
METHOD FOR MAKING A SLIDE FASTENER ELEMENT
Herbert Alberts, Caixa Postal 561, Sao Paulo, Brazil
Continuation-in-part of application Ser. No. 474,566, July 26, 1965. This application Sept. 12, 1966, Ser. No. 578,706
Claims priority, application Brazil, July 27, 1964, 7,129
Int. Cl. B29d 5/00; B29f 1/10
U.S. Cl. 264—261                 9 Claims

ABSTRACT OF THE DISCLOSURE

The method is characterized by the placing of a destructably removable filament in injection mold cavities. After the zipper elements have been cast, the filament is destroyed, thereby forming engagement holes for the teeth of opposing elements in the zipper.

This application is a continuation-in-part of my copending application Ser. No. 474,566, filed July 26, 1965, for "Injection Molding Apparatus for Manufacturing Zippers." A certified copy Brazilian application No. 7,129 was filed in application Ser. No. 474,566 on Aug. 1, 1967, and consequently is present in its file. Application Ser. No. 474,566 has since matured into U.S. Pat. No. 3,355,-771.

The present invention relates to a new fastener element for a slide fastener and to a method for injection molding this new element onto a slide fastener tape.

Coil slide fasteners presently manufactured are comparatively difficult to open and close. One reason for this difficulty is the manner in which coil fasteners must be attached to the tape in the fastener, this commonly being a stitching of the coil to the tape. The moving slider tends to move difficultly because of friction with the stitching. Another reason for this difficulty resides in the use of the welt as a guide for the slider of a coil fastener, resulting in friction between the two.

The above mentioned disadvantages of a coil slide fastener are inherent in the fastener because of the use of a coil. These disadvantages can be eliminated in a slide fastener in which the fastener elements form separate units, thus not being the parts of a continuous coil. However, design and manufacturing deficiencies in slide fasteners using separate fastener elements have hampered competition of these with coil slide fasteners.

The objects of a present invention are thus to provide a slide fastener having the advantages and lacking the disadvantages of a coil slide fastener; to provide a novel, separate fastener element; and to provide a novel method for manufacturing this new slide fastener.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a plan view of a separate fastener element of the invention. The tape on which it is mounted has been sectioned on the line I—I of FIGURE 2.

FIG. 2 is a side view of FIG. 1.

FIG. 3 is a top view of FIG. 1.

FIG. 4 is a plan view of another embodiment of the separate fastener element of the invention.

FIG. 5 is an isometric showing of the fastener element of FIGURES 1-3.

FIG. 6 is a top view of a step in the method of making a slide fastener according to the invention.

FIG. 7 is a sectional view along the line 7—7 of FIG. 6.

FIG. 8 is a section similar to that in FIG. 7 of a modification of the method of the invention.

FIG. 9 is a section similar to that in FIG. 7 of a modification of the method of the invention.

FIG. 10 is a section similar to that in FIG. 7 of a modification of the method of the invention.

FIG. 11 is an elevational section of a closed prior art mold.

FIG. 12 is a view of the upper half of the mold along the line XII—XII of FIG. 11.

FIG. 13 is a plan view of the cast product after removal from the mold of FIGS. 11 and 12.

FIG. 14 is a section along the line XIV—XIV of FIG. 13.

FIG. 15 is a section along the line XV—XV of FIG. 6.

Referring in detail to FIGS. 1, 2, 3, and 5, single fastener element 10 is a continuous, injection molded piece including an inner wall 11, and outer wall 12 and two side walls 13. By "continuous" is meant that the piece is formed in one molding operation and thus that it is not assembled out of separately formed components. The inner wall 11, when the element has been cast on tape 24 to comprise a slide fastener, is piercing the tape 24. The side walls 13 and the inner wall 11 therefore surround the welt 14. Engagement hole 15 passes completely through the element between the welt and the outer wall and is parallel to the welt of the tape. Engagement projections 16 protrude from the outer wall in directions parallel to the welt and the engagement hole. The welt in welt hole 17 is separated from the engagement hole by a separating wall 18. While the engagement hole is shown circular, it is within the scope of the invention to give it another shape for engagement with the projections.

In the embodiment of FIG. 4, the separating wall is not present, engagement hole and welt hole being one chamber.

FIG. 6 illustrates the method of the invention, wherein the novel fastener elements are placed on the joining edge of a tape to form one stringer of the slide fastener of the invention. Shown is one half 20 of a steel injection mold. The mold is shown with its cavities exposed upwards.

FIG. 7 is a section of FIG. 6 and shows that filament 21 and welt 14 lie in hemicylindrical grooves 23 of the mold. The welt is integral with the tape 24, which has fastener element holes 25. The mold has cavities 26 to receive liquid plastic, which solidifies therein. These cavities are separated a distance $d$, which is slightly larger than the thickness $t$ of the fastener elements. When the liquid plastic is injected, inner walls 11 solidify in the holes 25. Consequently, the inner walls pierce the tape 24 and surround, in conjunction with separating walls 18 and side walls 13, the tape welt 14. This relationship is illustrated in the isometric FIGURE 5 and in the orthographic projections of FIGURES 1-3.

In making the stringer of a slide fastener element of the invention, filament 21 and tape 24, with its welt 14 and fastener element holes, are placed in one half of the mold, as illustrated in FIG. 6. The filament lies within the fastener element cavities 26 and passes between the cavities in a groove 23 of the mold. The filament is parallel to the edge of the tape and is spaced from those walls of the cavities which are lateral to it. The tape runs parallel to the row of cavities, protrudes into them, and has its fastener element holes 25 in alignment with the cavities. Then the other half of the mold is placed over the first half. The other half has cavities matching those of the first part. The filament 21 and tape 24 with its welt 14 are supported within the mold cavities 26 by the constrainment provided by the matching hemicylindrical grooves 23. The other half of the mold also has an injection hole, risers and feeders as required by technical considerations to obtain soundly cast elements. The filament 21 used in this invention is of a material which can withstand the temperatures and other conditions of the injection and which can thereafter be dissolved or powdered out to leave the engagement holes 15 in the separate fastener elements.

As an example, molten polyamide can be used to make the fastener elements. In this case, the filament can be made of wood flour and sugar as a binder. The manner of injection of molten material into fastener element mold cavities to obtain soundly cast elements is well known in the art. One injection system is that shown by G. Waldes et al. in U.S. Patent No. 3,175,028, issued Mar. 23, 1965, for "Slide Fastener Manufacture." This system is shown in FIGURES 11-14. Analogously to the present invention, a tape 43 is placed between the faces 35, 36 of the mold halves 37 and 38. Injected, molten polyamide flows through runner 39, through gates 40, into fastener cavities 42a, 42b. When the mold halves are taken away, remaining are fastener elements 44 on tape 43, with the plastic 45 which solidified in the runner and gates. This plastic 45 is removed. The welt 46 of Waldes is present as a separated filament which lies in grooves 47 and 48 cut through lands 50 and 51 of his mold halves.

After the molding in accordance with the present invention, the filament can be dissolved using hot water. It is not necessary that the filament be completely removed, provided that the residue does not interfere with the engagement of the engagement projections in the engagement holes. Other filament materials are possible, restrictions being that they must not spall or disintegrate during the injection, they must be removable after the injection, and their removal must not damage the fastener elements or the material of the tape.

The temperature conditions to which the filaments are subjected are not severe, because the steel molds quickly absorb the heat of the injected liquid. Other materials suitable for filament use are wax, gelatin, a gelatin-starch-gum arabic mixture and shellac.

FIG. 8 shows an alternate embodiment of the invention. In this case, the filament has a core 30 of thread such as cotton thread and an outer shell 29 of soluble or otherwise removable material, examples of which are given above. This embodiment can be modified by increasing the relative size of the core 30. After dissolution of shell 29, the core 30 is removed.

FIG. 9 shows a filament 27 bonded to a welt 28.

FIG. 10 shows a tape lacking a welt. In this alternate example of the method of the invention, the thread of the tape 24 is woven around the filament 21. When the filament is removed, room is left for engagement of the engagement projections. The thread must be woven closely around the filament, so that when the filament is removed, the engagement projections will not snag in the threads of the tape.

I claim:

1. A method for making an injection molded slide fastener having fastener elements with engagement holes, comprising the steps of: placing a tape in an injection mold with fastener element holes of the tape in alignment with fastener element cavities of the mold; placing a destroyably removable filament within the fastener element cavities of said mold and passing between the cavities in grooves of the mold, the filament being placed parallel to the edge of said tape and spaced from those walls of said cavities lateral to the filament; injecting liquid material into said cavities; solidifying said liquid material; removing tape, solidified material and filament from said mold; and removing at least a minimum amount of said filament from said solidified material by destruction of said filament, thereby providing engagement holes.

2. A method as claimed in claim 1, wherein said filament has a non destructable core.

3. A method as claimed in claim 1, further including the step of attaching said filament to the edge of said tape.

4. A method as claimed in claim 3, wherein the step of attaching is accomplished by weaving threads, connected to said tape, around said filament.

5. A method as claimed in claim 4, wherein the woven threads cover said filament completely.

6. A method as claimed in claim 1, wherein the edge of said tape includes a welt (28), further including the step of bonding said filament to said welt (28).

7. A method as claimed in claim 1, wherein said filament is spaced from the edge of said tape.

8. A method for making an injection molded slide fastener in a mold having fastener element cavities aligned in a row, comprising placing a tape in the mold and protruding into the fastener element cavities; placing a destroyably removable filament within the fastener element cavities of said mold and passing between the cavities in grooves of the mold, the filament being placed parallel to the line of said row and spaced from those walls of said cavities lateral to the filament, injecting liquid material into said cavities; solidifying said liquid material; removing the solidified material and filament from said mold; and removing at least a minimum amount of said filament from said solidified material by destruction of said filament, thereby providing engagement holes in the solidified material.

9. A method as claimed in claim 8, further comprising the step of placing a tape through the fastener element cavities before the step of injecting liquid material.

References Cited

UNITED STATES PATENTS

| | | | |
|---|---|---|---|
| 1,713,679 | 5/1929 | Snelling | 264—220 X |
| 2,264,580 | 12/1941 | Morin | 18—1 |
| 2,735,139 | 2/1956 | Morin | 264—252 |
| 3,097,395 | 7/1963 | Yoshida | 18—30 X |
| 3,175,028 | 3/1965 | Waldes et al. | 264—252 |

ROBERT F. WHITE, Primary Examiner

K. J. HOVET, Assistant Examiner

U.S. Cl. X.R.

18—1; 264—263, 273, 275, 317